(12) United States Patent
Stille (10) Patent No.: US 9,634,860 B2
(45) Date of Patent: Apr. 25, 2017

(54) METHOD AND APPARATUS FOR COMMUNICATING IN WIND FARMS

(71) Applicant: SENVION SE, Hamburg (DE)

(72) Inventor: Lars Stille, Kiel (DE)

(73) Assignee: SENVION SE, Hamburg (DE)

( * ) Notice: Subject to any disclaimer, the term of this patent is extended or adjusted under 35 U.S.C. 154(b) by 0 days.

(21) Appl. No.: 14/388,736

(22) PCT Filed: Mar. 26, 2013

(86) PCT No.: PCT/EP2013/056445
§ 371 (c)(1),
(2) Date: Sep. 26, 2014

(87) PCT Pub. No.: WO2013/144166
PCT Pub. Date: Oct. 3, 2013

(65) Prior Publication Data
US 2015/0016470 A1    Jan. 15, 2015

(30) Foreign Application Priority Data
Mar. 28, 2012 (DE) .................. 10 2012 204 944

(51) Int. Cl.
*H04L 12/417* (2006.01)
(52) U.S. Cl.
CPC .................. *H04L 12/417* (2013.01)
(58) Field of Classification Search
None
See application file for complete search history.

(56) References Cited

U.S. PATENT DOCUMENTS 5,974,056 A * 10/1999 Wilson .................. H04L 12/417 370/509
2007/0033294 A1* 2/2007 Ungermann .............. G06F 1/12 709/248

(Continued)

FOREIGN PATENT DOCUMENTS

| DE | 10 2005 020 733 | 11/2006 |
|----|----|----|
| EP | 2 393 248 | 12/2011 |
| WO | WO-2005/119951 | 12/2005 |

OTHER PUBLICATIONS

International Search Report mailed Jun. 21, 2013, directed to International Application No. PCT/EP2013/056445; 12 pages.

*Primary Examiner* — Robert C Scheibel
(74) *Attorney, Agent, or Firm* — Morrison & Foerster LLP (57) ABSTRACT

In the method according to the invention for communicating between installations, which are organized in an order according to a sortable feature, for example installation numbers, in a wind farm, in which information transmitted by an installation in the form of a message is received by all other installations in the wind farm, a cyclically recurring, temporal transmission interval is set up. A point in time in the transmission interval at which the installation can transmit a message is assigned to each installation on the basis of the position thereof in the order, wherein points in time are organized from the start of the transmission interval, starting from the installation number at the first position in the order, in accordance with the position in the order. The start of the transmission interval is synchronized in all installations using a message from the installation at the first position in the order.

8 Claims, 4 Drawing Sheets

(56) References Cited

U.S. PATENT DOCUMENTS

2008/0198868 A1* 8/2008 Fuehrer .................... G06F 1/14
   370/442
2012/0102144 A1* 4/2012 Fritsche ................. H04L 12/42
   709/217

* cited by examiner

METHOD AND APPARATUS FOR COMMUNICATING IN WIND FARMS

REFERENCE TO RELATED APPLICATIONS

This application is a national stage application under 35 USC 371 of International Application No. PCT/EP2013/056445, filed Mar. 26, 2013, which claims priority to German Application No. 10 2012 204 944.4, filed Mar. 28, 2012, the entire contents of which are incorporated herein by reference.

FIELD OF THE INVENTION

The invention relates to a method for communication between installations in a wind farm and to an installation that is suitable for carrying out the method according to the invention.

BACKGROUND OF THE INVENTION

Wind farms usually comprise multiple wind energy installations, with the power produced in the wind energy installations being fed into a public grid via a network that is internal to the wind farm. In order to check and possibly adjust the quality of the power fed into the grid by the wind farm, there is frequently also what is known as a farm master provided that can send control specifications to the individual wind energy installations on the wind farm. Furthermore, a wind farm may also comprise additional installations that can provide additional information useful for controlling the wind energy installations, such as separate wind measurement stations.

All the installations on a wind farm (wind energy installations, farm master, wind measurement stations, etc.) are connected to a communication network. This communication network can be used to send information that can then be processed by a receiver and used for controlling one or more wind energy installations, by way of example.

It is known practice in the prior art for all the installations (apart from the farm master) to send their information to the farm master, which may subject said information to interim processing and then forwards it to the installations to which said information is relevant. It is also possible for the farm master to send all the information to all the installations connected to the communication network of the wind farm, regardless of the relevance of the information for individual installations. In this case, reference is made to a "broadcast". If a received piece of information is irrelevant to individual installations in this case, it is silently rejected by them.

Since the information fundamentally goes through the farm master, the latter needs to be designed in an adequate manner in order to be able to process all the information sent on the wind farm.

Furthermore, the prior art discloses communication methods with a plurality of subscriber units connected to a communication network, which communication methods involve the subscriber units sending data packets via the communication network on the basis of the principle of "time division multiple access" (TDMA). A corresponding communication method is known from DE 10 2005 020 733 A1, for example.

A TDMA communication method requires the subscriber units to send data via the communication network only at instants that are assigned to them. To ensure this, it is necessary, inter alia, for all the subscriber units to calculate their respective assigned instants on the basis of the same time base. In other words, the subscriber units need to be synchronized.

The patent application US 2008/0198868 describes a method in which the individual subscriber units are synchronized on the basis of a synchronization message ("reference message including a time information") sent by a specific synchronization unit ("time master"). If the primary synchronization device fails, separate redundant synchronization units ("reserve time master(s)") are provided that send synchronization messages to the subscriber units when required.

A disadvantage of this prior art is that separate synchronization units need to be provided or subscriber units need to be designed specifically for the operation of a synchronization unit. Furthermore, this prior art requires an explicit synchronization message that cannot contain any useful data, or can contain useful data only to a reduced extent.

SUMMARY OF THE INVENTION

An object of the invention is to provide a method and installations suitable for carrying out the method in which the disadvantages from the prior art do not arise or arise only to a reduced extent.

This can be achieved by the method and by an installation as broadly disclosed herein. Advantageous developments can be found in the detailed embodiments described below.

Accordingly, the invention relates to a method for communication between installations on a wind farm that are organized in an order according to a sortable feature, in which one installation receives information sent in the form of a message from all the other installations on the wind farm, wherein a cyclically recurring, temporal transmission interval is set up and each installation has, on the basis of its position in the order, an associated instant in the transmission interval at which it is permitted to send a message, wherein, starting from a first position in the order, instants are organized from the beginning of the transmission interval onward, in line with the position in the order, and wherein the beginning of the transmission interval is synchronized for all the installations by using a message from the installation at the first position in the order.

Furthermore, the invention relates to an installation for carrying out the method according to the invention comprising a communication unit having a reception module, a transmission module and a synchronization module, wherein the synchronization module is designed to read the position in the order from the messages received by the reception module from other installations and to use a stored position in the order to ascertain whether the installation is the installation at the first position in the order, and, if so, when a transmission interval has elapsed, to instruct the transmission module to send a message, and, if not, to await the reception of a message from the installation at the first position in the order, to determine an instant, starting from the instant of reception of a message from the installation at the first position in the order, in accordance with the stored position in the order and, at the instant, to instruct the transmission module to send a message. The message may contain any information from other components of the installation.

The term "installations" is used for functional units on a wind farm that, besides their actual task, such as generating current, are also connected to the communication network that is internal to the wind farm and are designed to send, receive and/or process information and messages via this communication network. By way of example, the installations may be wind energy installations, wind measurement stations or the farm master, each of which have communication means for sending and receiving information and messages via the communication network internal to the wind farm.

In connection with this invention, the "order" in which the installations are organized is an organization for the installations for communication purposes that may be based on arbitrary sortable features. If each installation has a corresponding feature, this feature of each installation can be used to stipulate an explicit order of the installations for communication among one another. By way of example, each installation may have a respective explicit installation number. The installations can then be organized on the basis of the installation number in an order of corresponding ascending installation numbers. The installation with the lowest installation number is then at the first position in the order, the installation with the next highest installation number is at the second position, etc. The installation with the highest installation number is arranged at the end of the order. It goes without saying that it is also possible for the installations to be organized according to descending installation numbers starting from the highest installation number. Furthermore, it is possible to use other sortable features apart from the installation number to form an order.

The chosen organization or the resulting order can reflect the actual physical arrangement of the installations on the wind farm. This is not absolutely necessary, however.

According to the invention, all the installations on a wind farm send their information to all the other installations on the wind farm. This applies regardless of the installations for which the sent information is or could be relevant. Each installation thus sends its information in the form of a message by "broadcast".

The processing capacity of the receivers of the individual installations on the wind farm for receiving messages is frequently limited. Usually, receivers have an input buffer for a prescribed number of messages that can be processed completely in a particular processing time. If the number of installations connected to the communication network of a wind farm exceeds a particular number and these were to send messages arbitrarily, the input buffer would regularly overflow, since the incoming messages would not be able to be processed quickly enough.

The invention therefore provides for the individual installations on a wind farm to be permitted to send messages only at particular instants in a transmission interval. The effect achieved by this is that the number of messages sent in a particular time period is limited, which means that the number of messages received and intended to be processed on each installation in a time period is also limited. This allows overflow of the input buffer of the installations to be prevented. The transmission interval is repeated cyclically, so that the individual installations are permitted to send messages regularly at particular instants.

So that the individual installations can actually send their messages only at the instant that is provided for them within a transmission interval, it is not just necessary for them to know the instant in relation to the transmission interval. In addition, it is also necessary to ensure that the transmission interval is synchronized with each installation. In this context, "synchronized" means that the transmission interval adopted by an installation begins (at least almost) simultaneously and ends (at least almost) simultaneously for each installation. If the transmission intervals were not synchronized for the installations, it might be the case that two installations send messages simultaneously even though they actually have different associated instants in the transmission interval for sending messages.

According to the invention, the synchronization is effected on the basis of a message from the installation at the first position in the order. Thus, if an installation receives a message from the installation at the first position in the order, receipt of the message is simultaneously rated as the beginning of the transmission interval, on the basis of this the instant for sending messages of its own is determined from the position in the order and a message of its own is sent at the calculated instant. Whether a message comes from the installation at the first position in the order can be read from the sender field of a message, for example, which can fundamentally contain information about the installation, for example the position in the order or the installation number of the sender installation.

In the case of the method according to the invention, the synchronization is thus effected not on the basis of a special synchronization message—as is still the case in the prior art—but rather on the basis of the messages sent by the individual installations to all the other installations on the wind farm. Since an installation receives all the messages from the other installations on the wind farm, this one installation can independently determine the installation at the first position in the order. On the basis of a message from the installation at the first position in the order, the one installation can in turn ascertain the instant at which it is permitted to send a message. This affords the advantage that there is a need neither for special synchronization messages, which are fundamentally to the detriment of the useful data rate, nor for specially designed synchronization units. The fail-safety of the system is also very high, since the redundancy level for synchronization of the installations on the wind farm corresponds to the number of these installations in practice.

The assignment of instants for sending messages within a transmission interval, according to the invention, affords a good level of robustness even when individual installations do not send any messages in a transmission interval. The reason is that an installation that is subsequent in accordance with the position in the order sends its messages regardless of whether the installation that is preceding in accordance with the position in the order has sent messages.

Nevertheless, it is fundamentally preferred if the installations fundamentally send messages at the instants that are provided for them, even if they possibly contain no information or no relevant information. If it is fundamentally assumed that each installation sends a message at the instant associated with it in each transmission interval, it is possible to establish whether the communication of an installation is disrupted.

The installation at the first position in the order requires special attention, since, according to the invention, its message is required for synchronizing the transmission interval for the remainder of the installations. This special attention is not reflected in a special structural or functional design of this installation at the present position in the order, however, but rather relates to the special handling of the messages from this installation by the other installations for synchronization. Various refinements of the method according to the invention may be provided alternatively or cumulatively in order to tolerate at least intermittent absence of messages from the installation at the first position in the order.

It is preferred if after two transmission intervals in which messages from the installation at the first position in the order are absent, the installation at the next highest position in the order becomes the installation at the first position in the order. The reference that is used to synchronize the transmission intervals of the individual installations is altered by this measure if the installation at the inherently first position in the order sends no further messages or corresponding messages are at least absent, for example on account of a fault. The synchronization of the individual installations is restored within a short time, namely no later than after two transmission intervals, as a result. Should the installation at the originally first position in the order be reactivated and send messages again, for example because the fault has been corrected, this installation can be used as the installation at the first position in the order again. The individual installations are then synchronized using the messages from this installation again.

Alternatively or additionally, it is possible for the individual installations, regardless of synchronization that has been effected and the instant calculated therefrom for sending a message or only in the event of absence of a message from the installation at the first position in the order, to send a message when a period of time corresponding to a complete transmission interval since the last sending of a message of their own has elapsed. If the installations send their messages in order at particular instants in a first transmission interval, this sequence and the intervals of time between the individual messages are fundamentally also observed when each installation sends its next message after a period of time, which is identical for each installation, corresponding to the transmission interval from the last message respectively sent by it. At least for a certain number of transmission intervals, it is thus possible for individual installations to continue to send messages in the order based on their position in the order, without the sending of messages from various installations overlapping. On account of unavoidable inaccuracies in the determination of the transmission interval and/or the instants of sending messages for the individual installations, this is not usually ensured on a permanent basis, however. Nevertheless, organized communication by the installations can be maintained for a certain time until the installation at the first position in the order is available again and sends messages, for example after a restart.

It is preferred if the gap between two adjacent instants in the transmission interval at which installations send messages is chosen such that overflow of the reception buffers for messages at the installations is avoided. It is thus possible to ensure that the number of messages sent to each installation does not exceed, in a particular time interval, the number of messages that can be processed at most by the individual installations within the time interval. Furthermore, a safety factor may be provided, so that, even in the event of a brief malfunction in an installation when the messages in its input buffer are processed, said input buffer does not overflow. Furthermore, provision may be made for particular installations, for example the farm master, to be permitted to send messages to all the, or individual, installations on the wind farm at each instant without there being the risk of overflow of an input buffer for one of or all the other installations. Even messages from installations that do not send messages in synchronized fashion should not regularly result in an overflow of the input buffers. To achieve this, the number of messages regularly sent in a time interval can be chosen to be lower than the maximum number possible. This results in an adequate buffer for additional messages.

The length of the time interval that an installation requires in order to process all the messages in the input buffer is called the processing time. If it is stipulated how many messages are regularly permitted to be received from other installations in this processing time so that sufficient functional reliability is ensured at any instant even in the event of brief failures or reception of messages from special installations, for example the farm master, or unsynchronized installations, the instant at which an installation sends a message can be calculated on the basis of the following formula:

$$\text{instant} = \frac{\text{processing time}}{\text{number of permitted messages}} \times \text{position in the order}$$

In this case, the instant thus determined relates to the beginning of each transmission interval.

It is preferred that between the instant at which the installation at the last position in the order in the transmission interval sends a message and the end of the transmission interval there is a time buffer provided, i.e. between said last instant and the start of the next transmission interval there is a certain period of time provided in which there is no provision for messages to be sent. The time buffer makes it possible to ensure that inaccuracies in the synchronization or small malfunctions in the installations do not result in messages from one transmission interval being sent in the next transmission interval.

The installation according to the invention is suited to being connected to a communication network that is internal to a wind farm and in which communication takes place on the basis of the method according to the invention. Reference is therefore made to the explanations above.

It is preferred if the installation is designed to send a second message after the first message has been sent, regardless of the receipt of a message from the installation at the first position in the order, when a period of time corresponding to a transmission interval has elapsed. To this end, the synchronization module may be designed to instruct the transmission module to send a message after a period of time that corresponds to a transmission interval has elapsed from the sending of a message.

It is preferred if the installation is a wind energy installation, a wind measurement station, a transformer station or a farm master.

Further advantageous refinements of the installation according to the invention are evident from the description of the method above.

BRIEF DESCRIPTION OF THE DRAWINGS

The invention will now be explained by way of example using exemplary embodiments with reference to the appended drawings, in which.

DETAILED DESCRIPTION OF THE INVENTION

In all the exemplary embodiments, it is assumed for reasons of clarity that the order of the individual installations is formed from an installation number sorted in ascending order. The installation number is a sortable feature of every installation. The installation with the lowest installation number adopts the first position in the order, the installation with the next highest installation number adopts the second position, etc. Instead of the installation number, however, it is also possible to use any other arbitrary sortable feature. Equally, reverse sorting, i.e. sorting in descending order from the highest feature or the highest installation number, is also possible.

Figure 1:
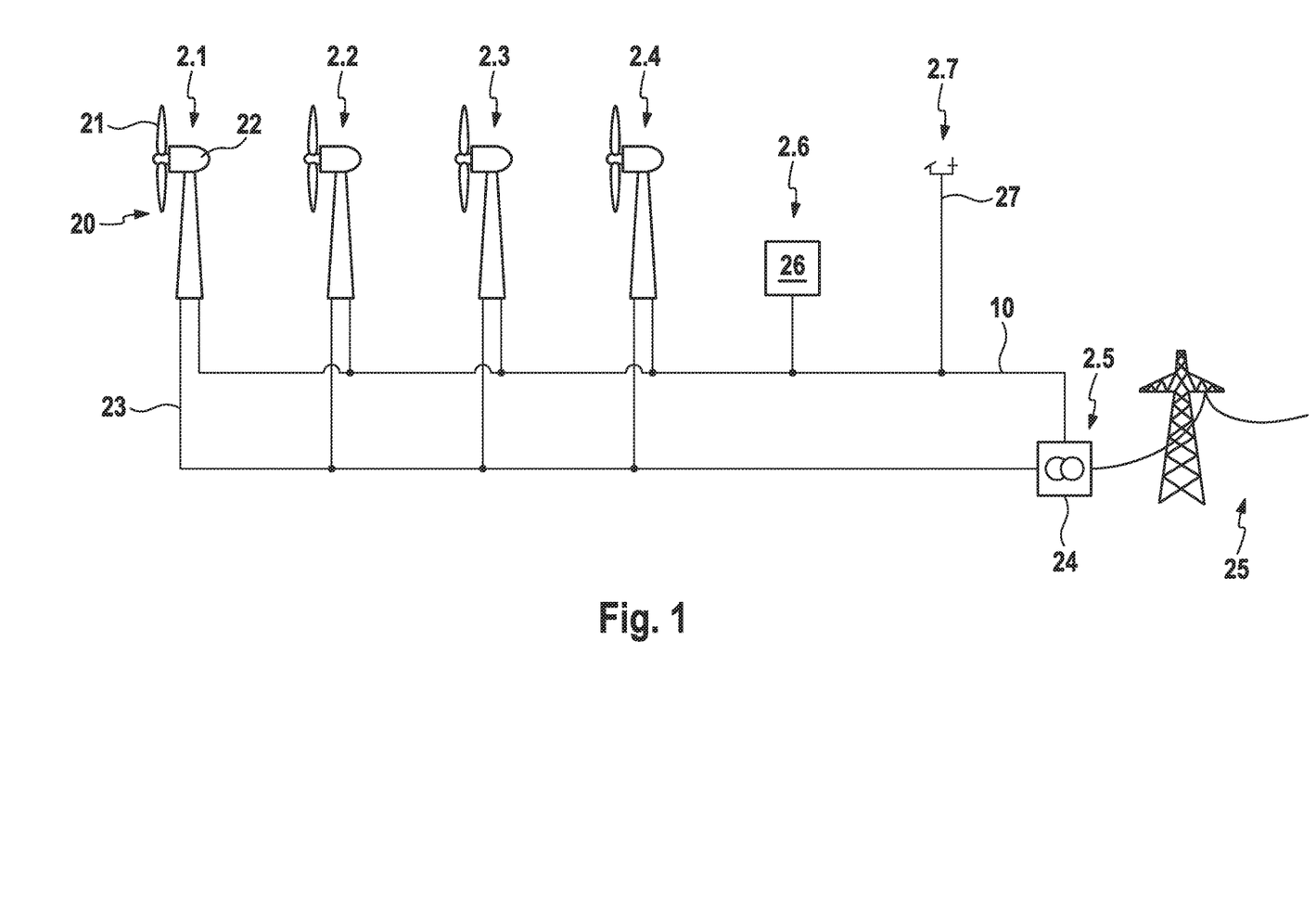
FIG. 1 shows a wind farm in which the installations communicate on the basis of the method according to the invention.

FIG. 1 shows a wind farm 1 having a multiplicity of installations 2. The installations 2 all have an installation number 1 to 7, which for reasons of clarity are shown as a suffix to the reference symbols.

The installations 2.1 to 2.4 are wind energy installations 20, in which a rotor having rotor blades 21 is used to convert wind into mechanical energy. This mechanical energy is converted into electric power in each case by means of a generator in the nacelle 22 of a wind energy installation 20 and fed into a power supply system 23 that is internal to the wind farm. As a further installation 2.5, the power supply system 23 internal to the wind farm has a transformer station 24 connected to it, which is used to transform the power fed into the power supply system internal to the wind farm such that it can be fed into a grid 25.

Figure 3:
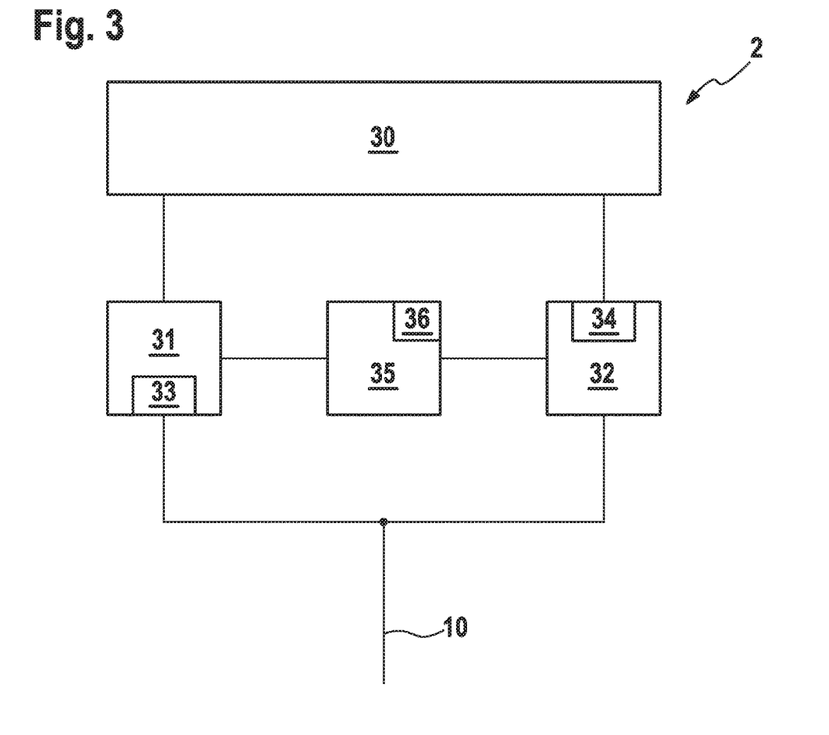
FIG. 3 shows a schematic illustration of an installation according to the invention.

Both the wind energy installations 20 or installations 2.1 to 2.4 and the transformer station 24 or installation 2.5 are furthermore also connected to a communication network 10 that is internal to the wind farm. In addition, a farm master 26 as installation 2.6 and a wind measurement station 27 as installation 2.7 are also connected to the communication network 10. The components required for connection to the communication network 10 are not shown in FIG. 1 for reasons of clarity, but may be produced for any installation 2.1 to 2.7, for example as shown in FIG. 3.

The individual installations 2.1 to 2.7 interchange information with one another in order to ensure the best possible operation of the whole wind farm 1. By way of example, it is thus possible to take account of information from the transformer station 24 or installation 2.5 concerning phase and voltage in the grid 25 when controlling the individual wind energy installations 20 or installations 2.1 to 2.4, so as to meet prescribed demands on the quality of the power fed into the grid 25 in respect of the active and/or reactive power component(s). The farm master 26 or installation 2.6 can likewise influence the control of the individual wind energy installations 20 or installations 2.1 to 2.4. The information from the anemometer 27 or installation 2.7 can be taken into account in this case.

Provision is made for all the installations 2.1 to 2.7 to send the information that is obtained from them and possibly required or able to be taken into account for the other installations to all other installations 2.1 to 2.7 in the communication network 10 in the form of messages by net broadcast. In this case, it does not matter whether the communication network 10 is possibly divided into subnetworks. In the case of subnetworks, all the messages are distributed all the subnetworks.

Figure 2:
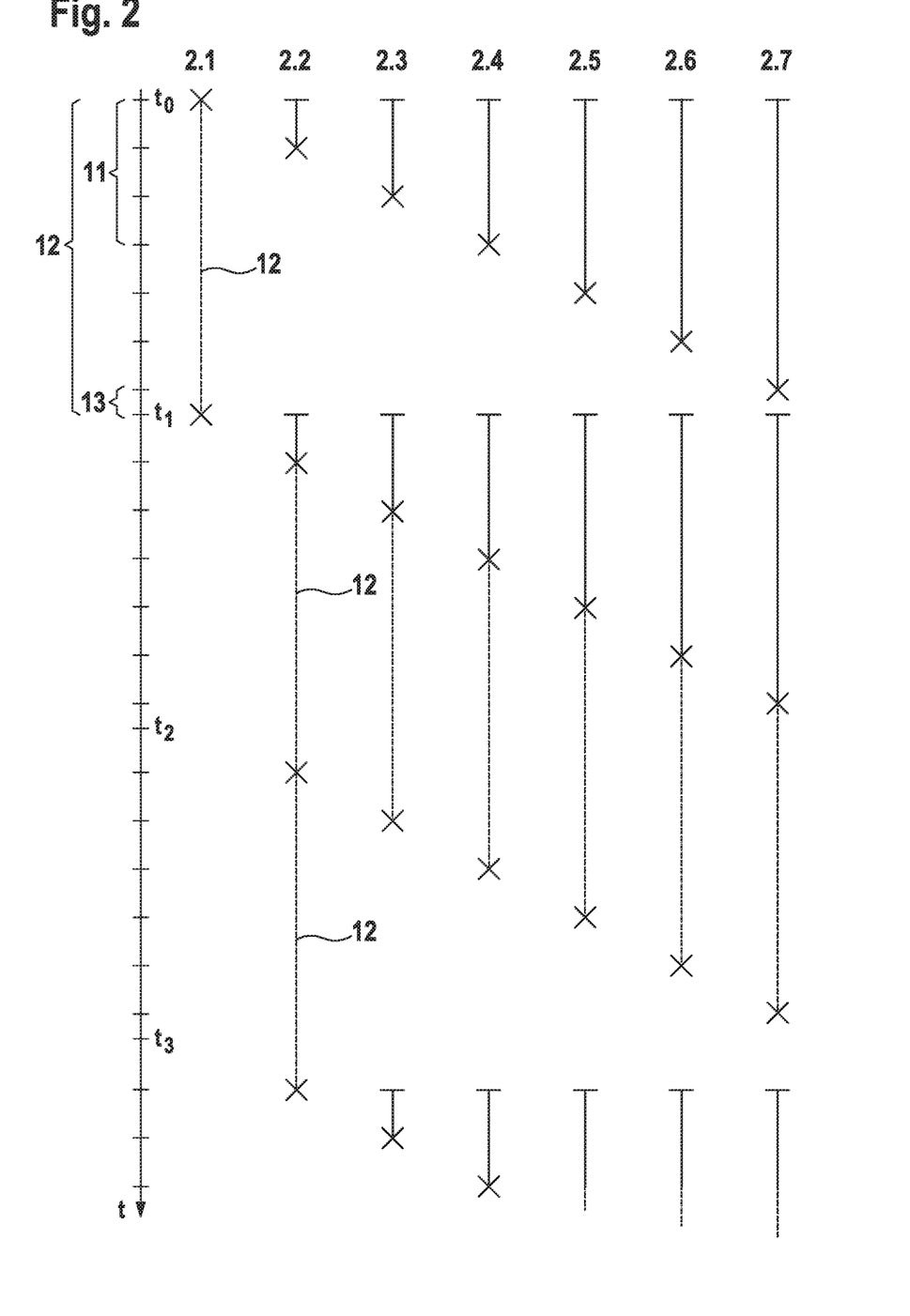
FIG. 2 shows a schematic sequence for the communication in the communication network of the wind farm from FIG. 1.

FIG. 2 schematically shows how the communication in the communication network 10 takes place (by net-directed broadcast) over time. In this case, the sending of a message from one of the installations 2.1 to 2.7 is denoted by a cross in each case, each message being sent by net broadcast, i.e. each of the other installations 2.1 to 2.7 receives the message sent in this manner. Transmission times between the individual installations 2.1 to 2.7 are not included in the illustration.

In order to ensure proper communication in the communication network 10, it is necessary for the messages received by one of the installations 2.1 to 2.7 not to exceed a maximum number of processable messages in a prescribed processing time 11. Each installation 2.1 to 2.7 has a reception buffer that is used to buffer-store incoming messages before they are processed. The reception buffer is of limited size and can be processed completely only within the prescribed processing time 11, i.e. all the messages in the reception buffer can be processed in this time. So that it is always possible for all the messages to be processed by all the installations 2.1 to 2.7, it is not permitted for more messages to be received than can be processed in a period corresponding to the processing time 11.

In the example shown, no more than four messages are sent via the communication network 10 in the processing time 11. The individual installations 2.1 to 2.7 must thus be designed such that they can process at least four messages in the processing time 11. In fact, the installations 2.1 and 2.7 in the exemplary embodiment are capable of processing eight messages in the processing period 11. This ensures that it is always possible for all the messages to be processed in practice, even if there should be a brief delay in the processing of messages at individual installations 2.1 to 2.7. In addition, it is thus possible for a superordinate installation, for example the farm master 26 or installation 2.6, to be able to send messages at any instant without the input buffers on the other installations 2.1 to 2.5, 2.7 overflowing and messages being unable to be processed.

At the instant t0, the installation 2 with the lowest installation number, in this case the installation 2.1, sends a message that is received by all the other installations 2.2 to 2.7. This message is a standard message with useful data, rather than a specific synchronization message, as required in the prior art, for example. From the instant of receipt of this message, the installations 2.2 to 2.7 determine the instant at which they are permitted to send a message. In this case, the instant is dependent on the installation number of the respective installation 2.2 to 2.7. The intervals of time between the individual messages sent via the communication network 10 are chosen in this case such that there are only ever four messages sent during a period corresponding to the processing time 11 as standard. Additional messages from superordinate installations or messages from installations that are not synchronized can increase the number of messages during a period corresponding to the processing time 11. Owing to the size provided for the input buffer, however, this is fundamentally noncritical.

The instant at which a message is sent from the installation 2 with the highest installation number, in this case installation 2.7, plus a time buffer 13 results in a transmission interval 12. Once a transmission interval has elapsed after a message is sent from the installation 2.1 with the lowest installation number, a message is sent again at the instant t1, which message is in turn used by the other installations 2.2 to 2.7 for synchronization in order to determine the instants for sending messages for the installations 2.2 to 2.7. Reference is made to the explanations above.

In the example illustrated, the installation 2.1 fails after sending the message at the instant t1. Accordingly, after a further transmission interval starting from instant t1, no message is sent by the installation 2.1 with the lowest installation number and received by the other installations 2.2 to 2.7 at the instant t2.

Provision is made for the other installations 2.2 to 2.7, in the absence of a message from the installation 2.1 with the lowest installation number, to automatically send messages when a transmission interval has elapsed since the last sending of a message by the same installation 2.2 to 2.7. Thus, even in the event of the installation 2.1 failing, it is possible to ensure communication in the communication network 10.

If at the instant t3, i.e. two transmission intervals since the last sending of a message by the installation 2.1 with the lowest installation number at the instant t1, there is also no message sent by this installation 2.1, the installation 2 with the next highest installation number, in this case installation 2.2, becomes the installation 2 with the lowest installation number. The remainder of the installations 2.3 to 2.7 then synchronize themselves as appropriate to the reception of messages from the installation 2.2. The installation 2.2 does not need to be of particular design in order to become the installation with the lowest installation number and hence to move up to the first position in the order of the installations. Instead, the installation 2.2 is, without any action by it, regarded as the installation with the lowest installation number by the remainder of the installations 2.3 to 2.7 after the described two transmission intervals 12 from the instant t1 to the instant t3. The installations 2.3 to 2.7 then synchronize themselves on the basis of the messages received from the installation 2.2. The installation 2.2 continues to send messages after a respective transmission interval 12 since the last sending of a message has elapsed.

FIG. 3 schematically shows an installation 2 according to the invention. In this case, only the portion of the installation 2 that is required for communication with the communication network 10 is shown. All other mechanical, electrical and control-engineering components of the installation 2 are combined in block 30. If the installation 2 is a wind energy installation, for example, these components 30 include a rotor, generator, pitch adjustment drive, converter, control devices, etc., for example.

Furthermore, the installation 2 also has a reception module 31 and a transmission module 32. The two modules 31, 32 are connected to the communication network 10, the reception module 31 being designed to receive messages from the communication network 10, while the transmission module 32 can send messages via the communication network 10.

The reception module 31 has an input buffer 32 that is used to buffer-store messages from the communication network 10 before they can be processed by the reception module 31. The input buffer 32 can buffer-store a prescribed number of messages, with the reception module 31 being able to process this prescribed number of messages within a prescribed processing time 11. The messages received by the reception module 31 are forwarded to the remainder of the components 30 of the installation 2, where they can be taken into account for controlling the installation 2, for example.

The transmission module 32 may likewise have a buffer 34 for messages that are to be sent, with the transmission module 32 sending a message only if it contains an appropriate command. The messages that are intended to be sent and can be buffer-stored in the buffer 34 come from the remainder of the components 30 of the installation 2 and, by way of example, contain measurement results or commands to other installations 2 in the communication network 10.

Furthermore, a synchronization module 35 is provided that is connected to the reception module 31 and the transmission module 32. The synchronization module 35 is capable of ascertaining the installation numbers of the installation that sent the relevant message from each received message. Furthermore, the synchronization module 35 is designed to provide the transmission module 32 with a signal for sending a message.

The synchronization module 35 is signed to ensure communication as explained with reference to FIGS. 1 and 2. To this end, the synchronization module 35 has a memory element 36 that stores the installation number of the installation 2 with which the synchronization module 35 is associated and also the installation number of the installation 2 with the lowest installation number.

Figure 4:
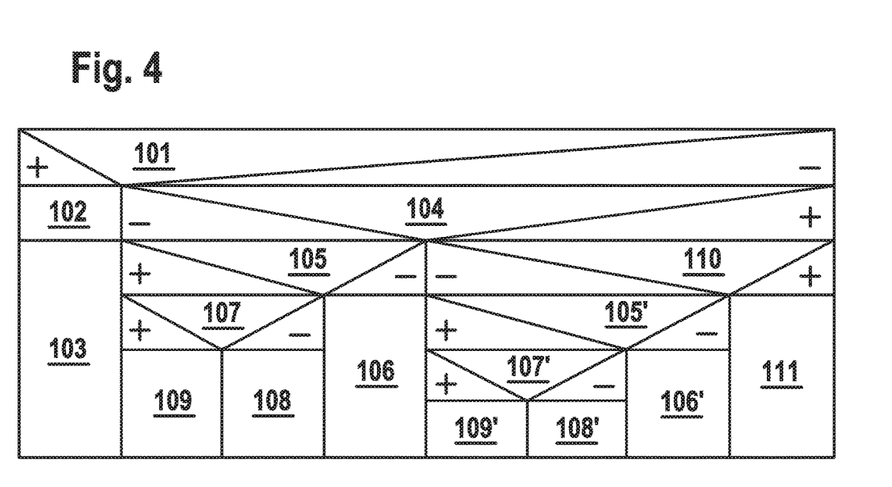
FIG. 4 shows a schematic illustration of the behavior of the installation from FIG. 3.

One possible behavior of the synchronization module 35 will now be explained in more detail with reference to FIG. 4.

A first step 101 is used to check whether the synchronization module 35 is associated with the installation 2 with the lowest installation number. This involves resorting to the installation numbers stored in the memory element 36.

If it is established that the synchronization module 35 is actually associated with the installation 2 with the lowest installation number, a complete transmission interval is waited (step 102). Next, the transmission module 32 is asked to send a message (step 103).

If the synchronization module 35 is not associated with the installation 2 with the lowest installation number, step 104 is used to establish whether the synchronization module 35 has already asked the transmission module 32 to send a message beforehand.

If this is not the case, a check is performed to determine whether the reception module 31 has received a message from the installation 2 with the lowest installation number (step 105). If this is not the case, reception of a corresponding message is awaited (step 106).

As soon as a message has been received from the installation 2 with the lowest installation number, the instant at which the installation 2 with which the synchronization module 35 is associated is permitted to send a message can be determined from the installation number. Step 107 is used to check whether this instant has been reached. If this is not yet the case, the process waits (step 108). As soon as the instant has been reached, the transmission module 32 is instructed to send a message (step 109). In this case, the message can come from the message buffer 34 and contain information from the other components 30 of the installation 2. Should the message buffer 34 be empty, a message without any special information content can be sent.

If the check in step 104 establishes that the synchronization module 35 has already instructed the transmission module 32 to send a message, step 110 is used to check whether a complete transmission interval has elapsed since the last instruction to the transmission module 32 to send a message. If this is the case, the transmission module 32 is instructed to send a message (step 111).

If the time of a complete transmission interval has not yet elapsed, a sequence of steps 105' to 109' that corresponds to steps 105 to 109 is executed. In this regard, reference is made to the explanations above.

Figure 5:
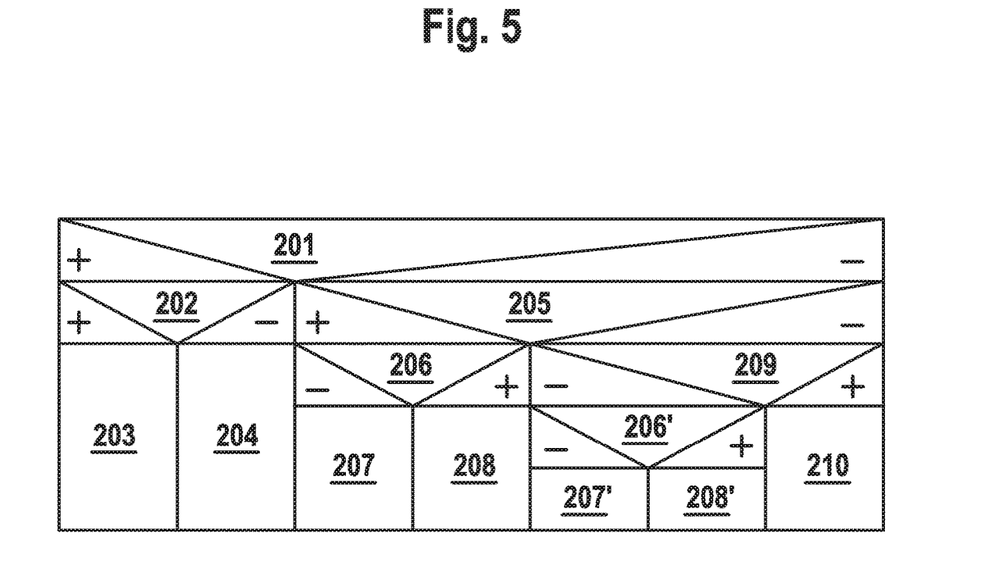
FIG. 5 shows a schematic illustration of an alternative behavior of the installation from FIG. 3.

FIG. 5 schematically shows an alternative behavior of the synchronization module 35.

A first step 201 is used to check whether the synchronization module 35 is associated with the installation 2 with the lowest installation number. This involves resorting to the installation numbers stored in the memory element 36.

If it is established so that the synchronization module 35 is actually associated with the installation 2 with the lowest installation number, step 202 is used to check whether this installation 2 was already the installation 2 with the lowest installation number in the preceding cycle. If this is the case, a complete transmission interval is waited and, after the transmission interval has elapsed, the transmission module 32 is asked to send a message (step 203).

If the installation was not (yet) the installation 2 with the lowest installation number in the preceding cycle, this indicates that the original installation 2 with the lowest installation number is defective or at least is not sending messages and the installation 2 with the next highest installation number needs to become the installation 2 with the lowest installation number. In this case, the installation 2 with the now lowest installation number instructs its transmission module 32 to send a message (step 204).

If the synchronization module 35 is not associated with the installation 2 with the lowest installation number, step 205 is used to establish whether the reception module 31 has received a message from the installation 2 with the lowest installation number since the last sending of a message via the transmission module 32 (step 205).

If this is the case, the instant at which the installation 2 with which the synchronization module 35 is associated is permitted to send a message can be determined from the installation number. Step 206 is used to check whether this instant has been reached. If this is not yet the case, the process waits (step 207). As soon as the instant has been reached, the transmission module 32 is instructed to send a message (step 208). In this case, the message can come from the message buffer 34 and contain information from the other components 30 of the installation 2.

If the check in step 205 establishes that no message has been received from the installation 2 with the lowest installation number, step 209 is used to check whether a complete transmission interval has elapsed since the last instruction to the transmission module to send a message. If this is the case, the transmission module 32 is instructed to send a message (step 210).

If the time of a complete transmission interval has not yet elapsed, a sequence of steps 206' to 208' that corresponds to steps 206 to 208 is executed. In this regard, reference is made to the explanations above.

The invention claimed is:

1. A method for communication between installations on a wind farm that are organized in an order according to a sortable feature, in which each installation receives a standard message from each of the other installations, wherein a cyclically recurring, temporal transmission interval is set up and each installation has, on the basis of its position in the order, an associated instant in the transmission interval at which it is permitted to send a standard message, wherein, starting from a first position in the order, instants are organized from the beginning of the transmission interval onward, in line with the position in the order, wherein the beginning of the transmission interval is synchronized for all the installations by using a standard message from the installation at the first position in the order, and wherein each installation independently determines the installation at the first position in the order based on all the standard messages received from the other installations on the wind farm, wherein the standard messages comprise useful data, and wherein when an installation is the installation at the first position in the order, the standard messages sent by the installation are used by the other installations to synchronize message transmission.

2. The method of claim 1, wherein an installation sends a standard message when the associated instant in the transmission interval, in accordance with the position in the order, is reached.

3. The method of claim 1, wherein after two transmission intervals in which standard messages from the installation at the first position in the order are absent, the installation at the next highest position in the order becomes the installation at the first position in the order.

4. The method of claim 1, wherein an installation sends a standard message, regardless of the receipt of a standard message from the installation at the first position in the order, when the time for an entire transmission interval since the last standard message sent by this installation has elapsed.

5. The method of claim 1, wherein the gap between the instants at which installations are permitted to send standard messages is chosen such that overflow of the reception buffers for messages at the installations is avoided.

6. The method of claim 1, wherein a processing time is prescribed that allows complete processing of a prescribed maximum number of standard messages situated in an input buffer, a number of permitted standard message receipts that is regularly allowed in a processing period is stipulated, and the instant for the sending of a standard message by an installation at a given position in the order is determined as follows:

$$\text{instant} = \frac{\text{prescribed processing time}}{\text{number of permitted standard messages receipts}} \times \text{given position in the order.}$$

7. An installation comprising a communicator having a receiver, a transmitter and a synchronizer, wherein the synchronizer is configured to read the position in the order from standard messages received by the receiver from other installations and to use a stored position in the order to ascertain whether the installation is the installation at the first position in the order, and, if so, when a transmission interval has elapsed, to instruct the transmitter to send a standard message, and, if not, to await the reception of a standard message from the installation at the first position in the order, to determine an instant, starting from the instant of reception of a standard message from the installation at the first position in the order, in accordance with the stored position in the order and, at the instant, to instruct the transmitter to send the standard message, wherein the installation independently determines the installation at the first position in the order based on the standard messages received from the other installations, wherein the standard messages comprise useful data, and wherein when the installation is the installation at the first position in the order, the standard message sent by the transmitter is used by the other installations to synchronize message transmission.

8. The installation of claim 7, wherein the installation is configured to send a second standard message after the first standard message has been sent, regardless of the receipt of a standard message from the installation at the first position in the order, when a period of time corresponding to a transmission interval has elapsed.

* * * * *

UNITED STATES PATENT AND TRADEMARK OFFICE
CERTIFICATE OF CORRECTION

| | |
|---|---|
| PATENT NO. | : 9,634,860 B2 |
| APPLICATION NO. | : 14/388736 |
| DATED | : April 25, 2017 |
| INVENTOR(S) | : Lars Stille |

It is certified that error appears in the above-identified patent and that said Letters Patent is hereby corrected as shown below:

In the Specification

At Column 11, Line number 38, after "module" please insert --32--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*